US012610379B2

(12) United States Patent
Back et al.

(10) Patent No.: US 12,610,379 B2
(45) Date of Patent: Apr. 21, 2026

(54) METHOD FOR OPERATING RELAY UE RELATED TO SIDELINK RELAY IN WIRELESS COMMUNICATION SYSTEM

(71) Applicant: LG Electronics Inc., Seoul (KR)

(72) Inventors: Seoyoung Back, Seoul (KR); Giwon Park, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 670 days.

(21) Appl. No.: 17/917,810

(22) PCT Filed: Apr. 8, 2021

(86) PCT No.: PCT/KR2021/004396
§ 371 (c)(1),
(2) Date: Oct. 7, 2022

(87) PCT Pub. No.: WO2021/206462
PCT Pub. Date: Oct. 14, 2021

(65) Prior Publication Data
US 2023/0136005 A1    May 4, 2023

(30) Foreign Application Priority Data

Apr. 8, 2020    (KR) ........................ 10-2020-0042740
Apr. 28, 2020    (KR) ........................ 10-2020-0051155

(51) Int. Cl.
*H04W 72/40*      (2023.01)
*H04W 28/02*      (2009.01)
(Continued)

(52) U.S. Cl.
CPC ........... *H04W 72/40* (2023.01); *H04W 28/02* (2013.01); *H04W 72/543* (2023.01); *H04W 88/04* (2013.01)

(58) Field of Classification Search
CPC ..... H04W 72/20; H04W 72/23; H04W 72/25; H04W 72/40; H04W 72/54; H04W 72/543; H04W 76/14; H04W 88/04
See application file for complete search history.

(56) References Cited

U.S. PATENT DOCUMENTS

2018/0146494 A1* 5/2018 Khoryaev ............. H04W 76/15
2018/0249516 A1* 8/2018 Jung ..................... H04W 76/11
(Continued)

FOREIGN PATENT DOCUMENTS

EP        3609259        2/2020
KR    10-2019-008387    1/2019

OTHER PUBLICATIONS

Intel Corporation, "Sidelink Resource Allocation Schemes for NR V2X Communication," R1-1900483, Presented at 3GPP TSG RAN WG1 Ad-Hoc Meeting 1901, Taipei, Taiwan, Jan. 21-25, 2019, 24 pages.

(Continued)

*Primary Examiner* — Pao Sinkantarakorn
(74) *Attorney, Agent, or Firm* — Fish & Richardson P.C.

(57)    ABSTRACT

An embodiment is a method for operating a relay UE related to a sidelink relay in a wireless communication system, the method comprising steps for the relay UE to: deliver a sidelink grant request including a Packet Delay Budget (PDB) of a remote UE to a base station; and receive an uplink grant configuration and a sidelink grant configuration from the base station as a response to the sidelink grant request, wherein only information related to the sidelink grant configuration among the uplink grant configuration and the sidelink grant configuration is delivered by the relay UE to the remote UE. The uplink grant configuration is used for delivering packets of the remote UE to the base station, wherein the packets are packets received through a resource indicated by the sidelink grant configuration, and the (Continued)

resource indicated by the sidelink grant configuration and a resource indicated by the uplink grant configuration both satisfy the PDB.

14 Claims, 23 Drawing Sheets

(51) Int. Cl.
 *H04W 72/543* (2023.01)
 *H04W 88/04* (2009.01)

(56) References Cited

U.S. PATENT DOCUMENTS

| | | | |
|---|---|---|---|
| 2020/0059901 A1* | 2/2020 | Larsson | H04W 88/04 |
| 2020/0077434 A1 | 3/2020 | Kim et al. | |
| 2021/0050954 A1* | 2/2021 | Ryu | H04W 76/14 |
| 2021/0058907 A1* | 2/2021 | Fakoorian | H04L 1/1812 |
| 2021/0168814 A1* | 6/2021 | Chen | H04W 72/02 |
| 2022/0338232 A1* | 10/2022 | Cao | H04W 72/1263 |
| 2023/0073469 A1* | 3/2023 | Wang | H04W 40/22 |

OTHER PUBLICATIONS

International Search Report in International Appln. No. PCT/KR2021/004396, dated Jul. 21, 2021, 5 pages (with English Translation).
LG Electronics Inc., "Introduction of 5G V2X with NR Sidelink," R2-2001969, Presented at 3GPP TSG-RAN WG2 Meeting #109-e, Online, Feb. 24-Mar. 6, 2020, 39 pages.

* cited by examiner (b)

(a)

PU5-U (a)

PU5-C (b)

(a)

(b)

(a)                                    (b)

METHOD FOR OPERATING RELAY UE RELATED TO SIDELINK RELAY IN WIRELESS COMMUNICATION SYSTEM

CROSS-REFERENCE TO RELATED APPLICATIONS

This application is a National Stage application under 35 U.S.C. § 371 of International Application No. PCT/KR2021/004396, filed on Apr. 8, 2021, which claims the benefit of Korean Application Nos. 10-2020-0051155, filed on Apr. 28, 2020, and 10-2020-0042740, filed on Apr. 8, 2020. The disclosures of the prior applications are incorporated by reference in their entirety.

TECHNICAL FIELD

The following description relates to a wireless communication system, and more particularly to an operation method and apparatus related to allocation of a resource to a remote user equipment (UE) in a sidelink relay.

BACKGROUND ART

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

Embodiment(s) relates to a method of receiving a necessary sidelink/uplink grant when a remote UE transmits data to a gNB through a relay UE in UE-to-Network Relay and a temporal precedence relationship required when configuring the sidelink/uplink grant.

According to an embodiment, an operation method of a relay user equipment (UE) related to a sidelink relay in a wireless communication system includes transferring a sidelink grant request including a Packet Delay Budget (PDB) of a remote UE to a base station (BS) by a relay UE, and receiving an uplink grant configuration and a sidelink grant configuration in response to the sidelink grant request from the BS by the relay UE, wherein the relay UE transfers only information related to the sidelink grant configuration among the uplink grant configuration and the sidelink grant configuration to the remote UE, the uplink grant configuration is used to transfer a packet of the remote UE received through a resource indicated in the sidelink grant configuration to the BS, and both the resource indicated in the sidelink grant configuration and a resource indicated in the uplink grant configuration satisfy the PDB.

According to an embodiment, a relay User Equipment (UE) in a wireless communication system includes at least one processor, and at least one computer memory operatively connected to the at least one processor and configured to store instructions for causing the at least one processor to perform operations when being executed, wherein the operations include transferring a sidelink grant request including a Packet Delay Budget (PDB) of a remote UE to a base station (BS), and receiving an uplink grant configuration and a sidelink grant configuration in response to the sidelink grant request from the BS, wherein the relay UE transfers only information related to the sidelink grant configuration among the uplink grant configuration and the sidelink grant configuration to the remote UE, the uplink grant configuration is used to transfer a packet of the remote UE received through a resource indicated in the sidelink grant configuration to the BS, and both the resource indicated in the sidelink grant configuration and a resource indicated in the uplink grant configuration satisfy the PDB.

According to an embodiment, an operation method of a base station (BS) related to a sidelink relay in a wireless communication system includes receiving a sidelink grant request including a Packet Delay Budget (PDB) of a remote UE from a relay UE by the BS, and transmitting an uplink grant configuration and a sidelink grant configuration in response to the sidelink grant request to the relay UE by the BS, wherein only information related to the sidelink grant configuration among the uplink grant configuration and the sidelink grant configuration is transferred to the remote UE through the relay UE, the uplink grant configuration is used to transfer a packet of the remote UE received through a resource indicated in the sidelink grant configuration to the BS, and both the resource indicated in the sidelink grant configuration and a resource indicated in the uplink grant configuration satisfy the PDB.

According to an embodiment, a base station (BS) in a wireless communication system includes at least one processor, and at least one computer memory operatively connected to the at least one processor and configured to store instructions for causing the at least one processor to perform operations when being executed, wherein the operations include receiving a sidelink grant request including a Packet Delay Budget (PDB) of a remote UE from a relay UE, and transmitting an uplink grant configuration and a sidelink grant configuration in response to the sidelink grant request to the relay UE, wherein only information related to the sidelink grant configuration among the uplink grant configuration and the sidelink grant configuration is transferred to the remote UE through the relay UE, the uplink grant configuration is used to transfer a packet of the remote UE received through a resource indicated in the sidelink grant configuration to the BS, and both the resource indicated in the sidelink grant configuration and a resource indicated in the uplink grant configuration satisfy the PDB.

According to an embodiment, in a processor for performing operations for a relay user equipment (UE) related to a sidelink relay in a wireless communication system, the operations including transferring a sidelink grant request including a Packet Delay Budget (PDB) of a remote UE to a base station (BS), and receiving an uplink grant configuration and a sidelink grant configuration in response to the sidelink grant request from the BS, wherein the relay UE transfers only information related to the sidelink grant configuration among the uplink grant configuration and the sidelink grant configuration to the remote UE, the uplink grant configuration is used to transfer a packet of the remote UE received through a resource indicated in the sidelink grant configuration to the BS, and both the resource indicated in the sidelink grant configuration and a resource indicated in the uplink grant configuration satisfy the PDB.

According to an embodiment, in a non-volatile computer-readable storage medium for storing at least one computer program including an instruction for causing at least one processor to perform operations for a relay user equipment (UE) related to a sidelink relay when being executed by the at least one processor, the operations including transferring a sidelink grant request including a Packet Delay Budget (PDB) of a remote UE to a base station (BS), and receiving an uplink grant configuration and a sidelink grant configuration in response to the sidelink grant request from the BS, wherein the relay UE transfers only information related to the sidelink grant configuration among the uplink grant configuration and the sidelink grant configuration to the remote UE, the uplink grant configuration is used to transfer a packet of the remote UE received through a resource indicated in the sidelink grant configuration to the BS, and both the resource indicated in the sidelink grant configuration and a resource indicated in the uplink grant configuration satisfy the PDB.

The resource indicated in the sidelink grant configuration may be ahead of the resource indicated in the uplink grant configuration in a time axis.

The sidelink grant configuration may include ID related information of the remote UE.

ID related information may be a Medium Access Control (MAC) ID of the remote UE.

A packet of the remote UE may include information related to SidelinkUEInformation of the remote UE.

The information related to the SidelinkUEInformation of the remote UE may include SidelinkUEInformation received from the remote UE in the SidelinkUEInformation of the relay UE.

The information related to the SidelinkUEInformation of the remote UE may include ID related information of the remote UE.

The ID related information of the remote UE may be received from the remote UE.

ID related information of the remote UE may be newly allcoated by the relay UE.

The relay UE may communicate with at least one of another UE, a UE related to an autonomous driving vehicle, a BS, or a network.

According to an embodiment, a grant configuration process required for a UE-to-Network Relay operation may be specified, and a packet in a PDB may be transmitted.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
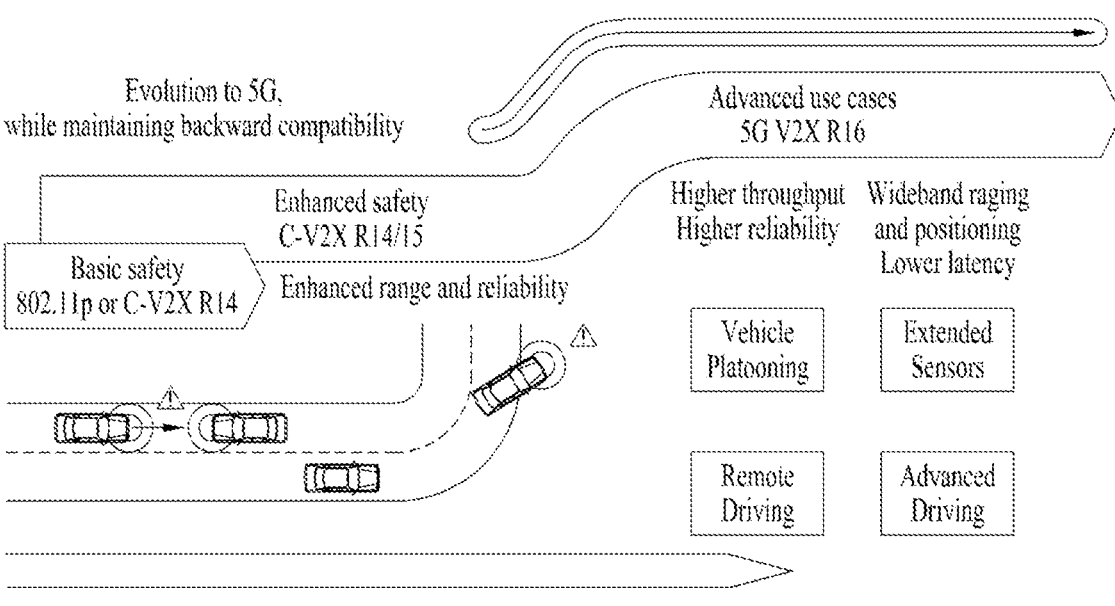
FIG. 1 is a diagram comparing vehicle-to-everything (V2X) communication based on pre-new radio access technology (pre-NR) with V2X communication based on NR.
Figure 2:
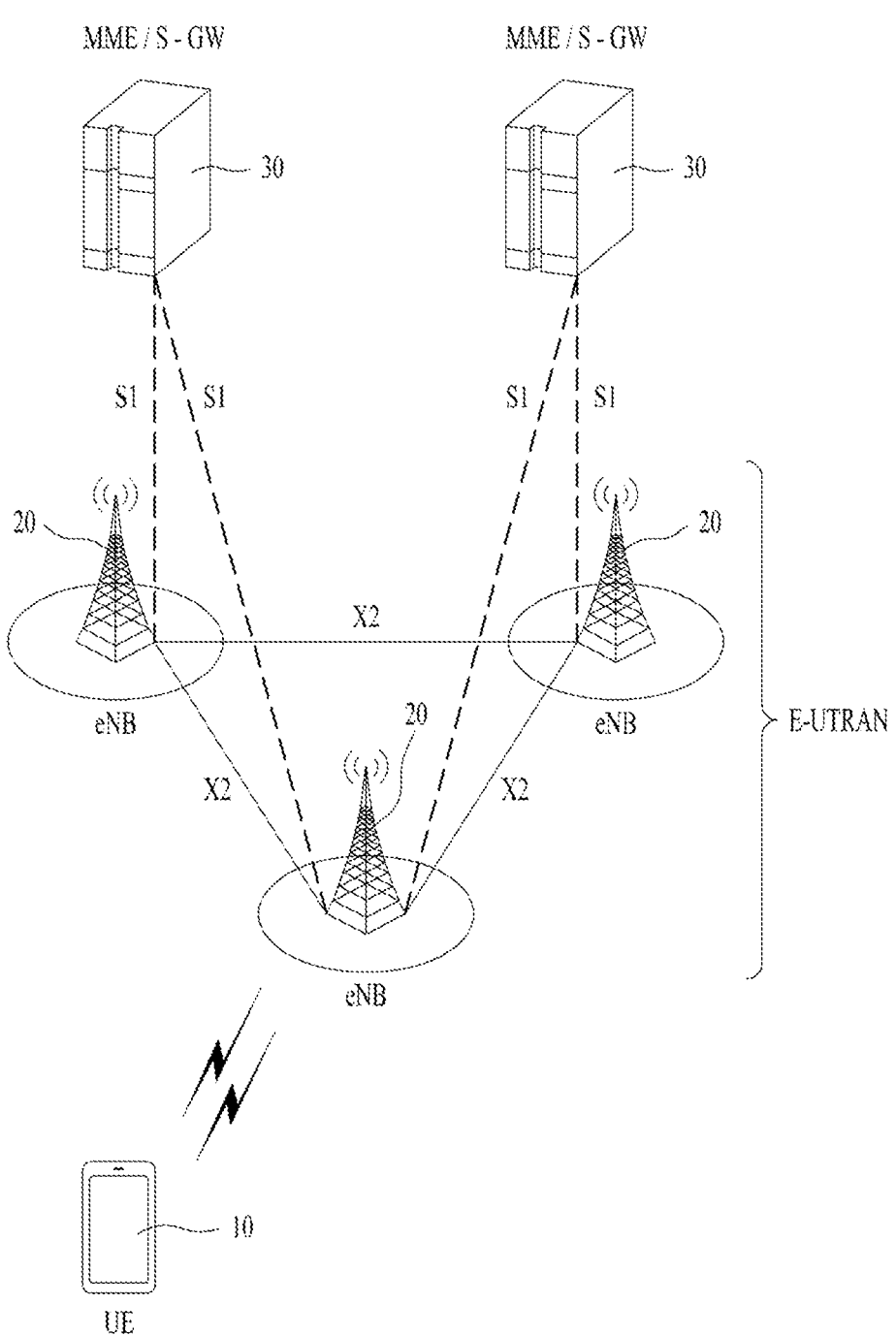
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
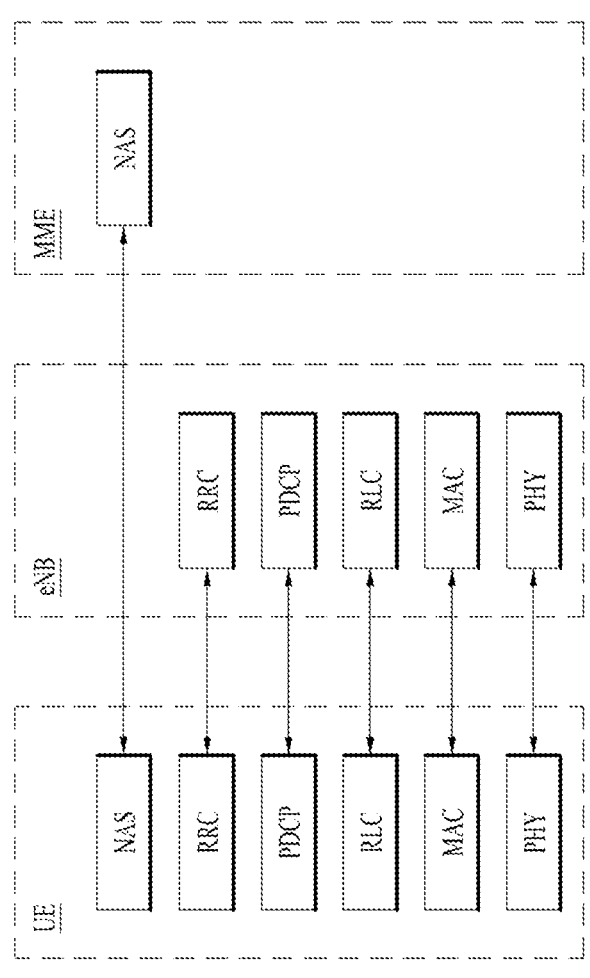
FIG. 3 is a diagram illustrating user-plane and control-plane radio protocol architectures according to an embodiment of the present disclosure.
Figure 3:
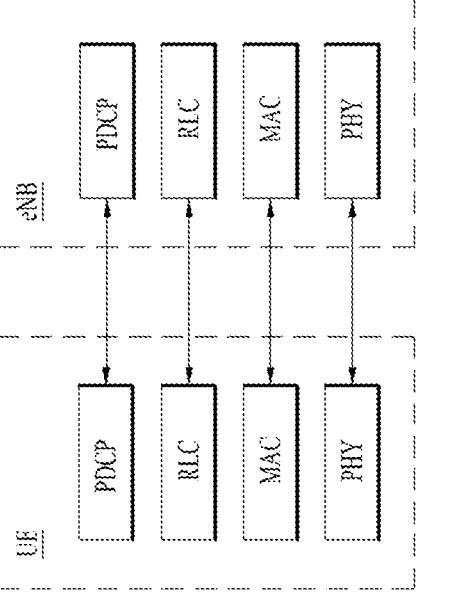

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
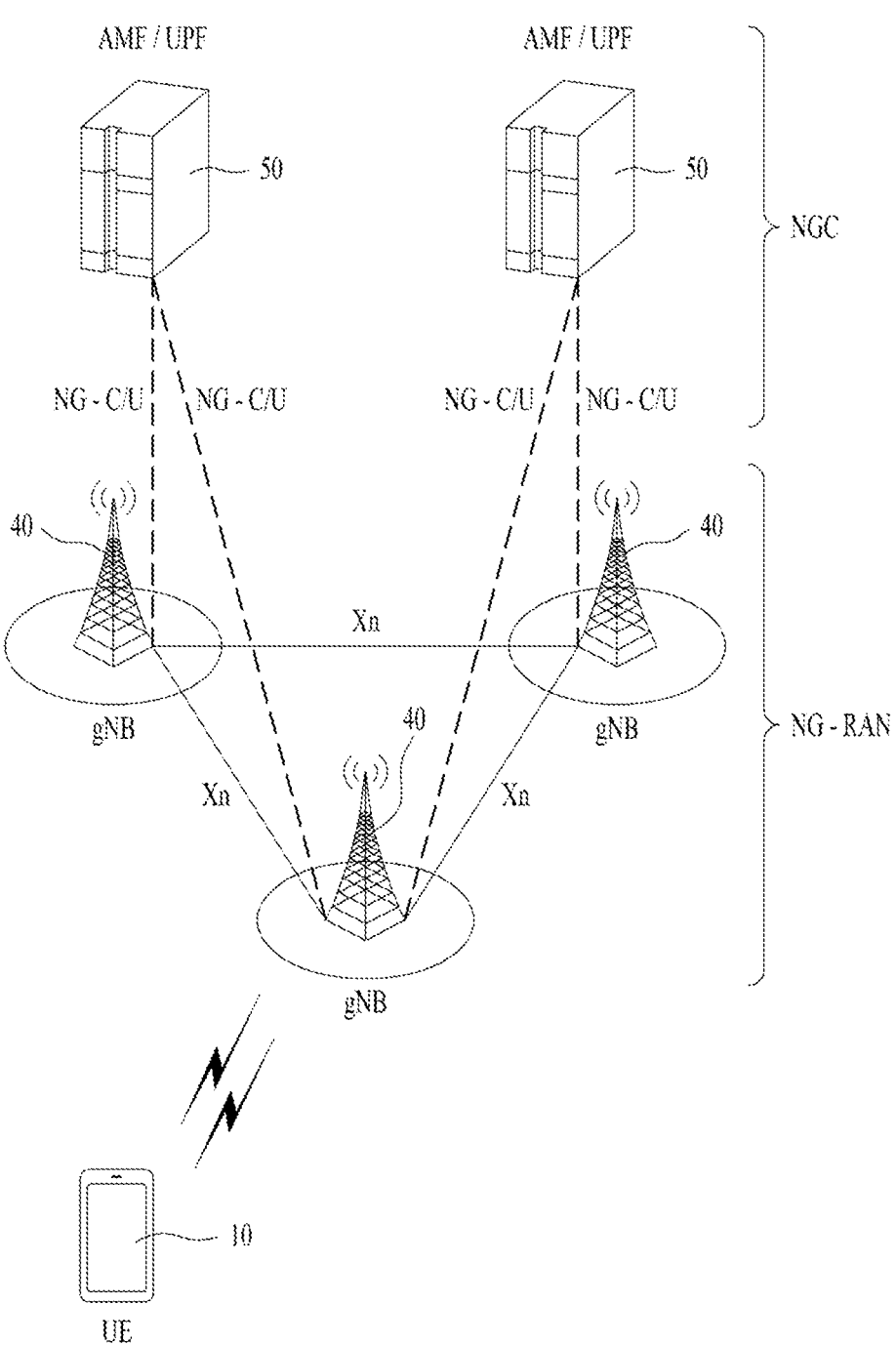
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
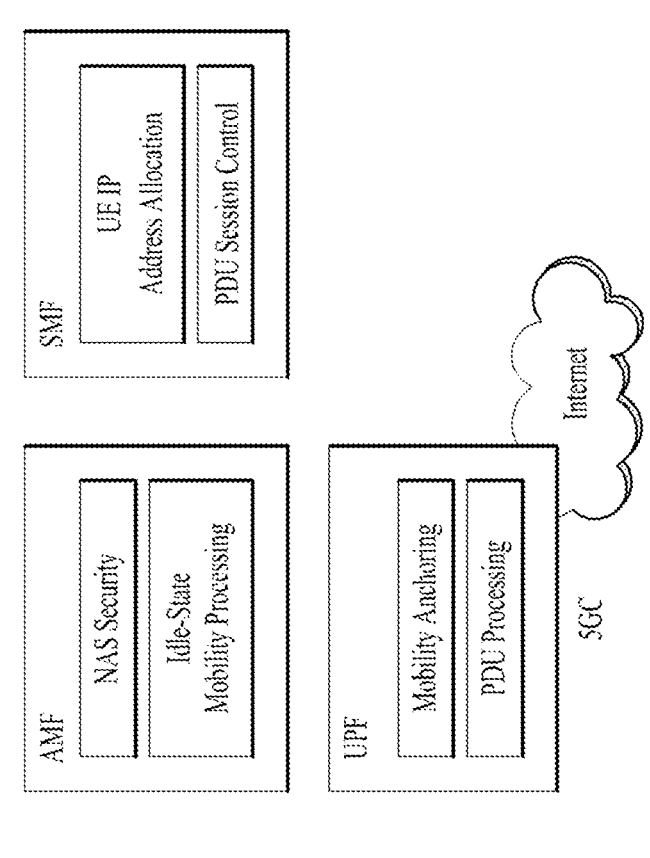
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
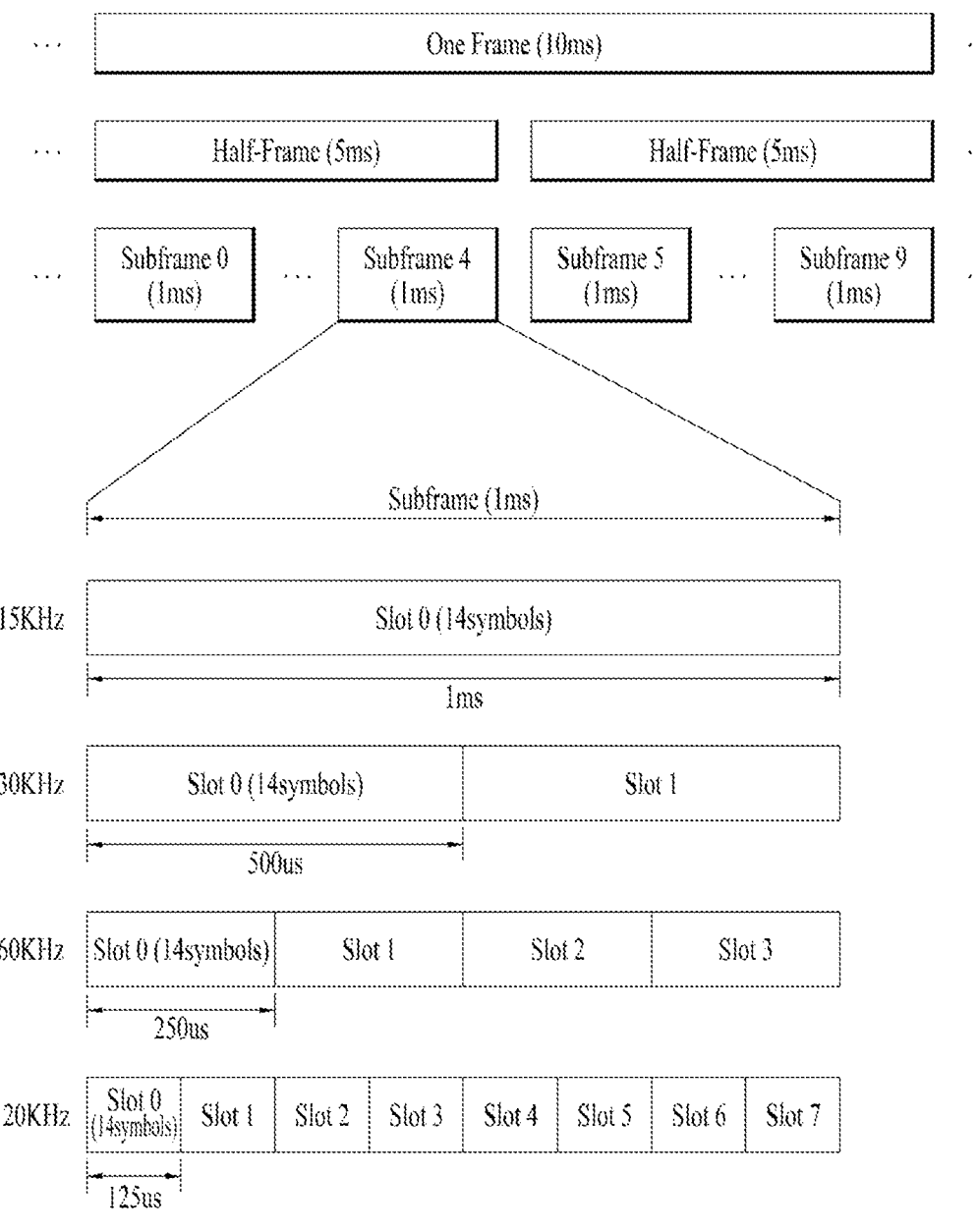
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 712 5 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
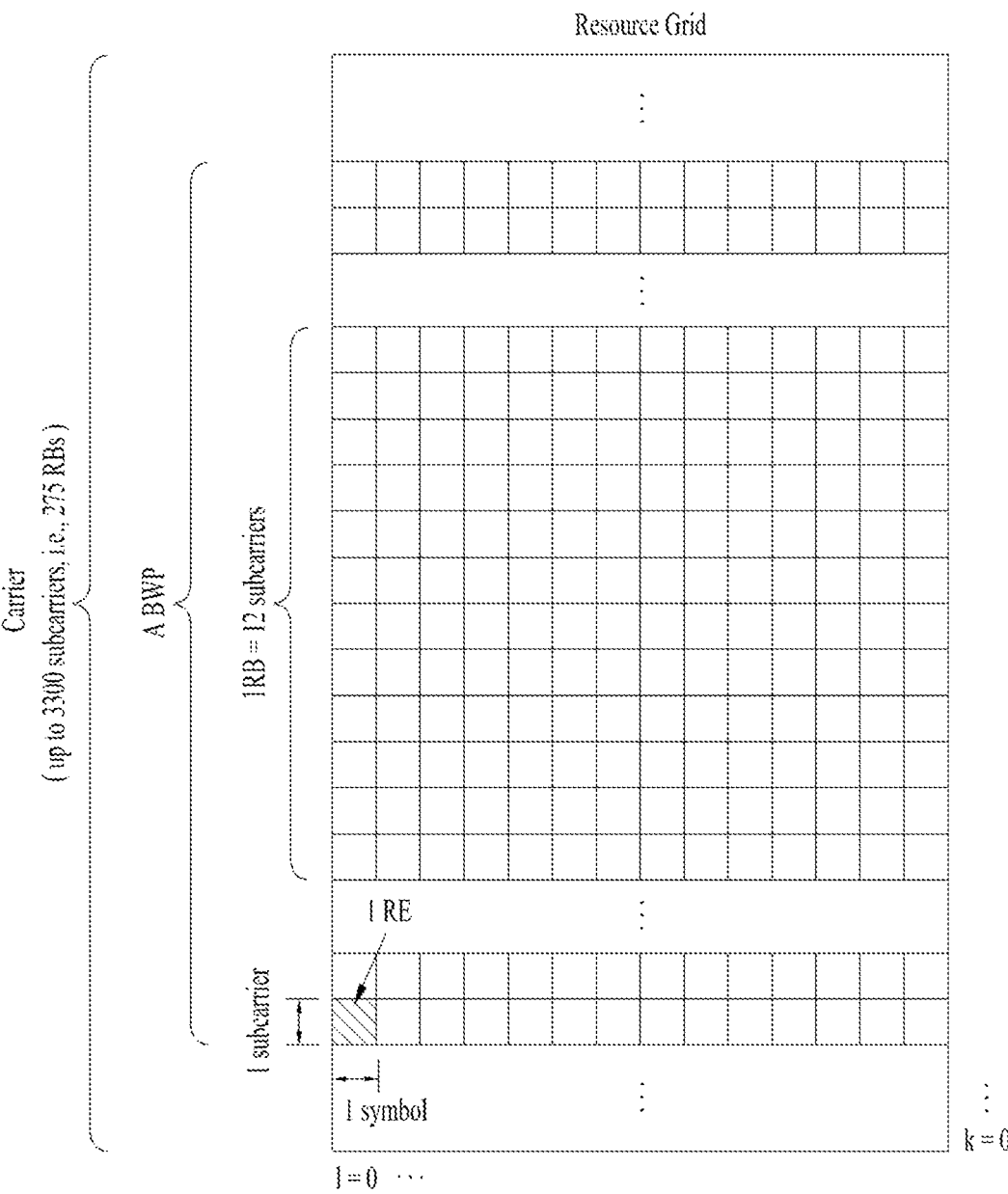
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
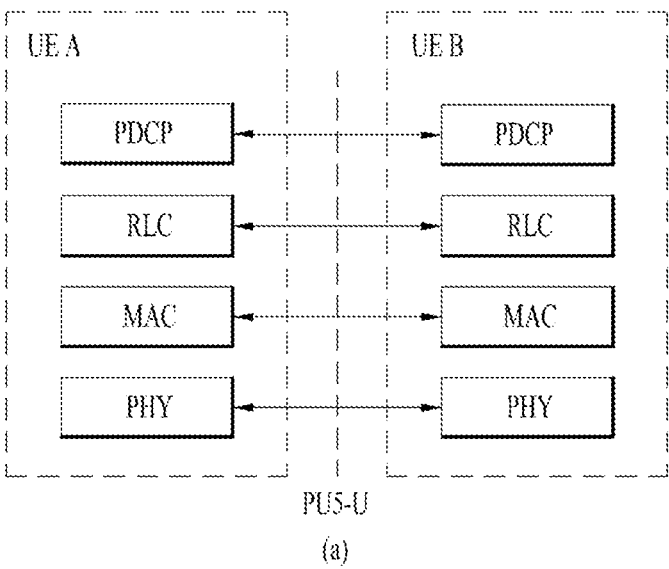
FIG. 8 is a diagram illustrating radio protocol architectures for sidelink (SL) communication according to an embodiment of the present disclosure.
Figure 8:
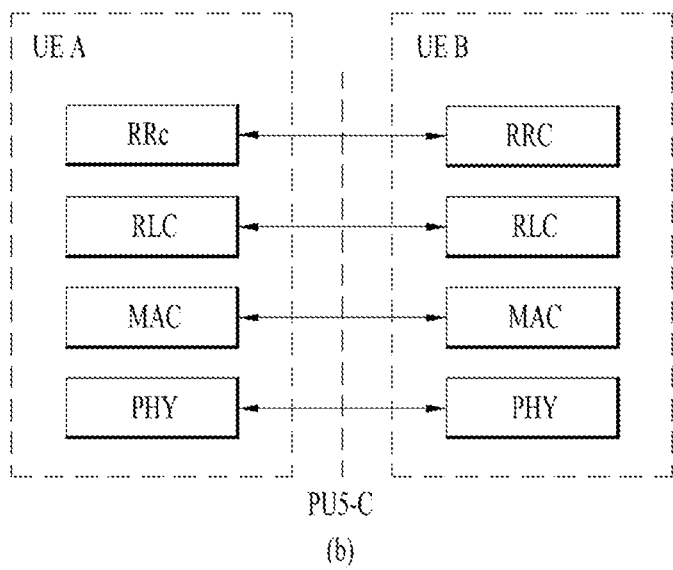

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
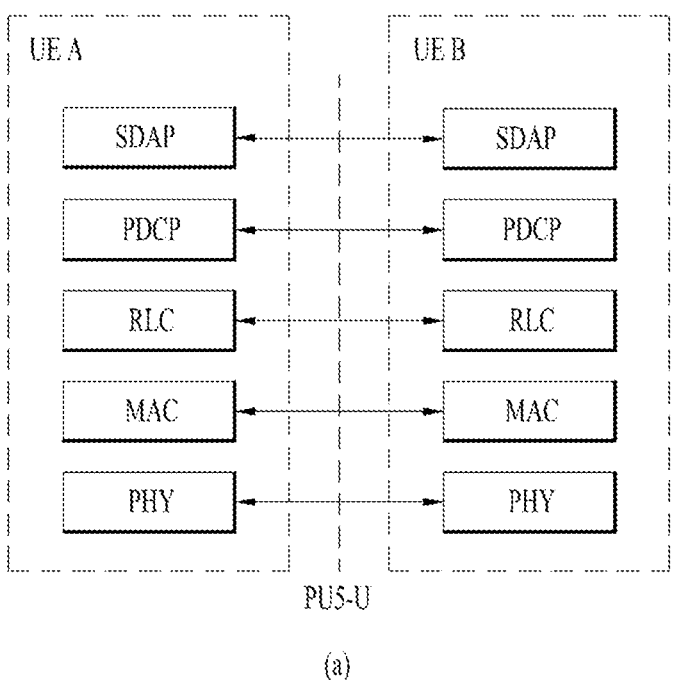
FIG. 9 is a diagram illustrating radio protocol architectures for SL communication according to an embodiment of the present disclosure.
Figure 9:
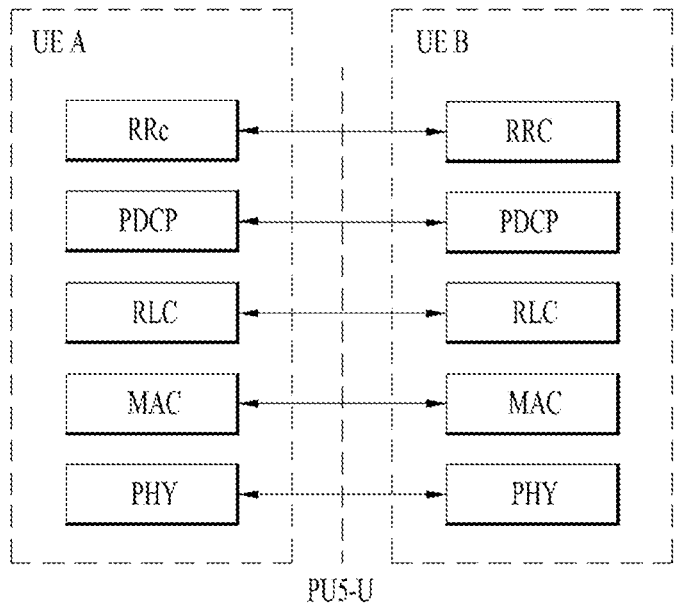

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Resource allocation in SL will be described below.

Figure 10:
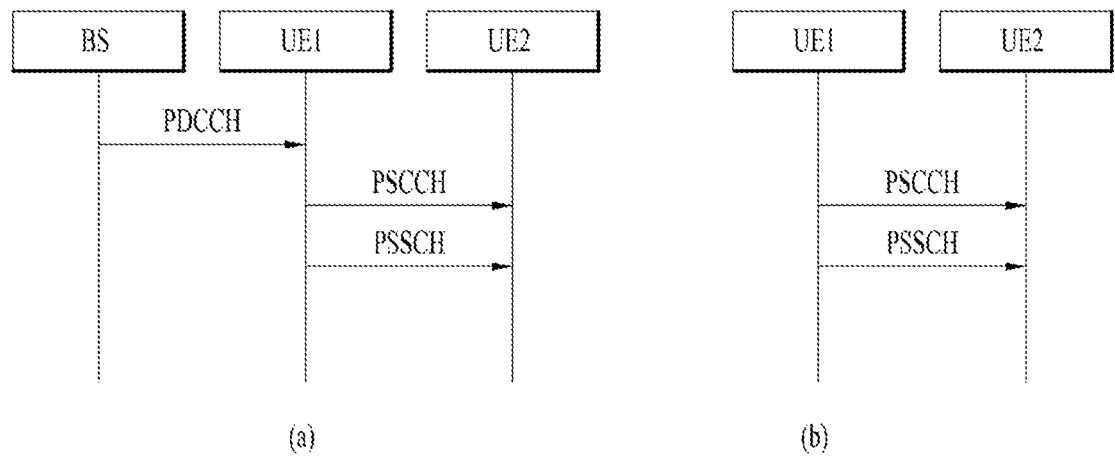
FIG. 10 illustrates a procedure in which a UE performs V2X or SL communication according to a transmission mode according to an embodiment of the present disclosure.

FIG. 10 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10(a) illustrates a UE operation related to LTE transmission mode 1 or LTE transmission mode 3. Alternatively, for example, FIG. 10(a) illustrates a UE operation related to NR resource allocation mode 1. For example, LTE transmission mode 1 may be applied to general SL communication, and LTE transmission mode 3 may be applied to V2X communication.

For example, FIG. 10(b) illustrates a UE operation related to LTE transmission mode 2 or LTE transmission mode 4. Alternatively, for example, FIG. 10(b) illustrates a UE operation related to NR resource allocation mode 2.

Referring to FIG. 10(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at $T1 \geq 0$, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or an SL CSI-RS transmission indicator or information about the number of SL CSI-RS antenna ports (to be transmitted);

location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 11:
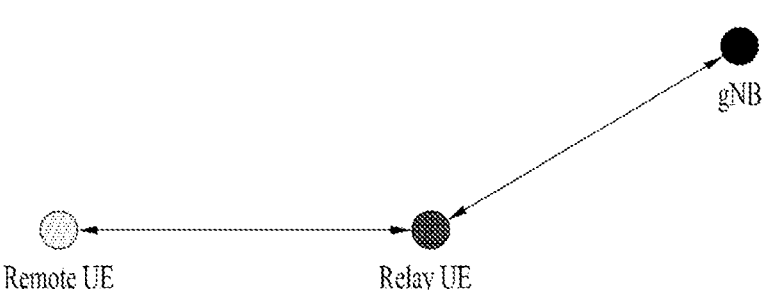
FIGS. 11 to 16 show various embodiment(s) related to configuration of DRX.

UE-to-Network Relay in 3GPP may operate as follows. Referring to FIG. 11, data transferred from a gNB may be transferred to a remote UE through a relay UE, and data transferred from the remote UE to the gNB may be transferred through the relay UE. It may be assumed that the relay UE always exists in coverage of the gNB, and in this case, the remote UE may be present inside/outside the coverage of the gNB. When the remote UE is outside the coverage of the gNB, the coverage of the gNB may be extended through the relay UE. Even when the remote UE is inside the coverage of the gNB, the relay UE may be used to communicate with the gNB for power saving, etc. Communication between the gNB and the relay UE may be performed through a Uu link, and communication between the remote UE and the relay UE may be performed through sidelink.

In order for the remote UE to transmit a packet to the gNB, a grant therefor needs to be allocated. Grant allocation in relay transmission has not been specifically addressed in the sidelink relay related specs (TR 23.703, TR 23.713, TR 36.746, and TR 23.752) described so far. In addition, when the remote UE operates in MODE1, a specific method of requesting and receiving an SL resource has not been described. Accordingly, hereinafter, sidelink and Uu link grants that are to be requested during an operation of UE-to-Network Relay will be described. In detail, a method of requesting and receiving an SL resource by the remote/relay UE when the remote UE operates in a MODE 1 method will be described. In addition, a TDM allocation method between a sidelink resource and a UU link resource between the remote UE and the relay UE for MODE1 resource allocation of the remote UE will also be proposed.

Figure 12:
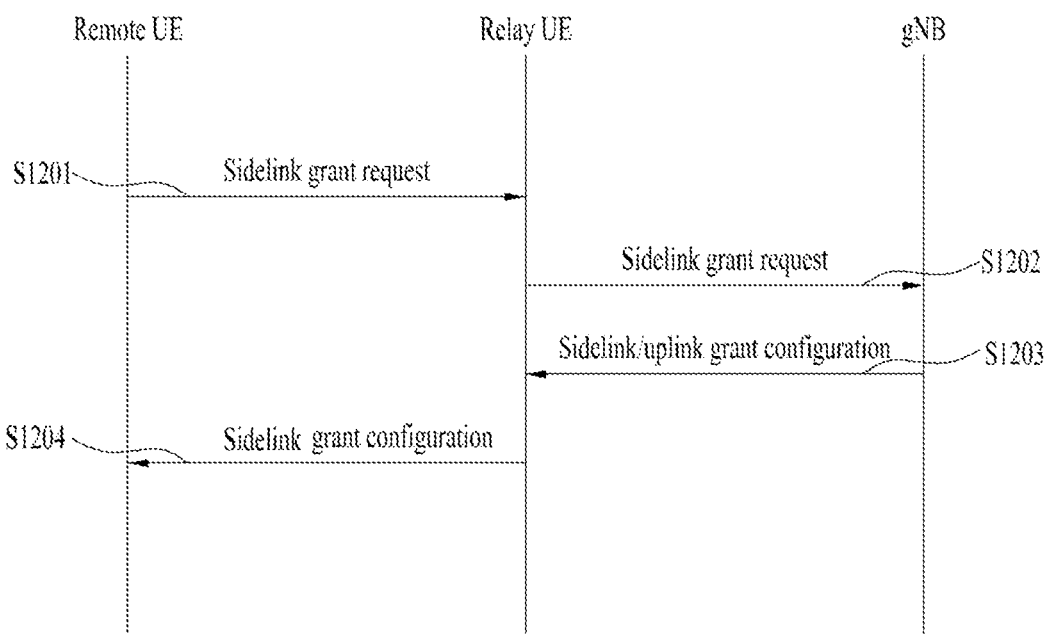

The relay UE according to an embodiment may transfer a sidelink grant request including a Packet Delay Budget (PDB) (or PDB information) of the remote UE to the BS (S1201 to S1202 in FIG. 12). That is, when the remote UE transfers the sidelink grant request message to the relay UE, the relay UE may forward the corresponding message to the gNB, and in this case, the sidelink grant request message may include PDB information of the message to be trans- mitted. In this case, the 'grant request' message may be replaced with a Buffer Status Report (BSR) of a MAC layer.

The relay UE may receive an uplink grant configuration and a sidelink grant configuration in response to the sidelink grant request from the BS (S1203 in FIG. 12). Since the gNB knows a relay UE to which the remote UE requesting the sidelink grant request is currently connected, the BS may simultaneously generate not only the sidelink grant configu- ration but also the uplink grant configuration for the sidelink grant request of the remote UE transferred by the relay UE and may transmit the same to the UE (S1204 in FIG. 12). In addition, the BS may simultaneously generate not only the sidelink grant configuration but also the uplink grant con- figuration for the sidelink grant request of the remote UE, transferred by the relay UE, may transmit only the uplink grant configuration to the relay UE, and may transmit only the sidelink grant configuration to the remote UE.

This is because, in the case of not the relay operation, sidelink grant needs to be allocated for sidelink, and uplink grant needs to be allocated for uplink, but in the case of UE-to-Network relay, both a sidelink grant and an uplink grant are required for the remote UE to transmit a packet to the gNB.

The relay UE may transfer only information related to the sidelink grant configuration among the uplink grant con- figuration and the sidelink grant configuration to the remote UE. The remote UE may transmit a packet to the relay UE by using the sidelink grant configuration. In addition, the uplink grant configuration may be used to transfer the packet of the remote UE received through a resource indicated in the sidelink grant configuration to the BS.

In relation to transfer of the sidelink grant configuration, the sidelink grant configuration may include ID-related information of the remote UE. Here, the ID-related infor- mation may be a Medium Access Control (MAC) ID of the remote UE. That is, the relay UE may transmit only the content corresponding to the sidelink grant configuration thereamong to the corresponding remote UE. In this case, the sidelink grant configuration transmitted by the gNB may include a MAC ID of the remote UE.

In a step before transferring the sidelink grant request, when the remote UE establishes a connection with the relay UE, the relay UE may inform the gNB that the relay UE itself is a relay UE and a remote UE to which the relay UE is connected, through a message such as SidelinkUEInfor- mation.

Both the resources indicated in the sidelink grant con- figuration and the resources indicated in the uplink grant configuration may satisfy the PDB. That is, both the resource indicated in the sidelink grant configuration and the resource indicated in the uplink grant configuration may need to satisfy the PDB of the remote UE. When performing a relay operation, a grant for sidelink and a grant for uplink need to be given, and need to be allocated in the PDB of the packet that the remote UE intends to transmit. In relation to the operation, the resource indicated in the sidelink grant con- figuration may be ahead of the resource indicated in the uplink grant configuration in the time axis. Packet allocation in the PDB, an allocation order, and the like will be described with reference to FIG. 13.

Figure 13:
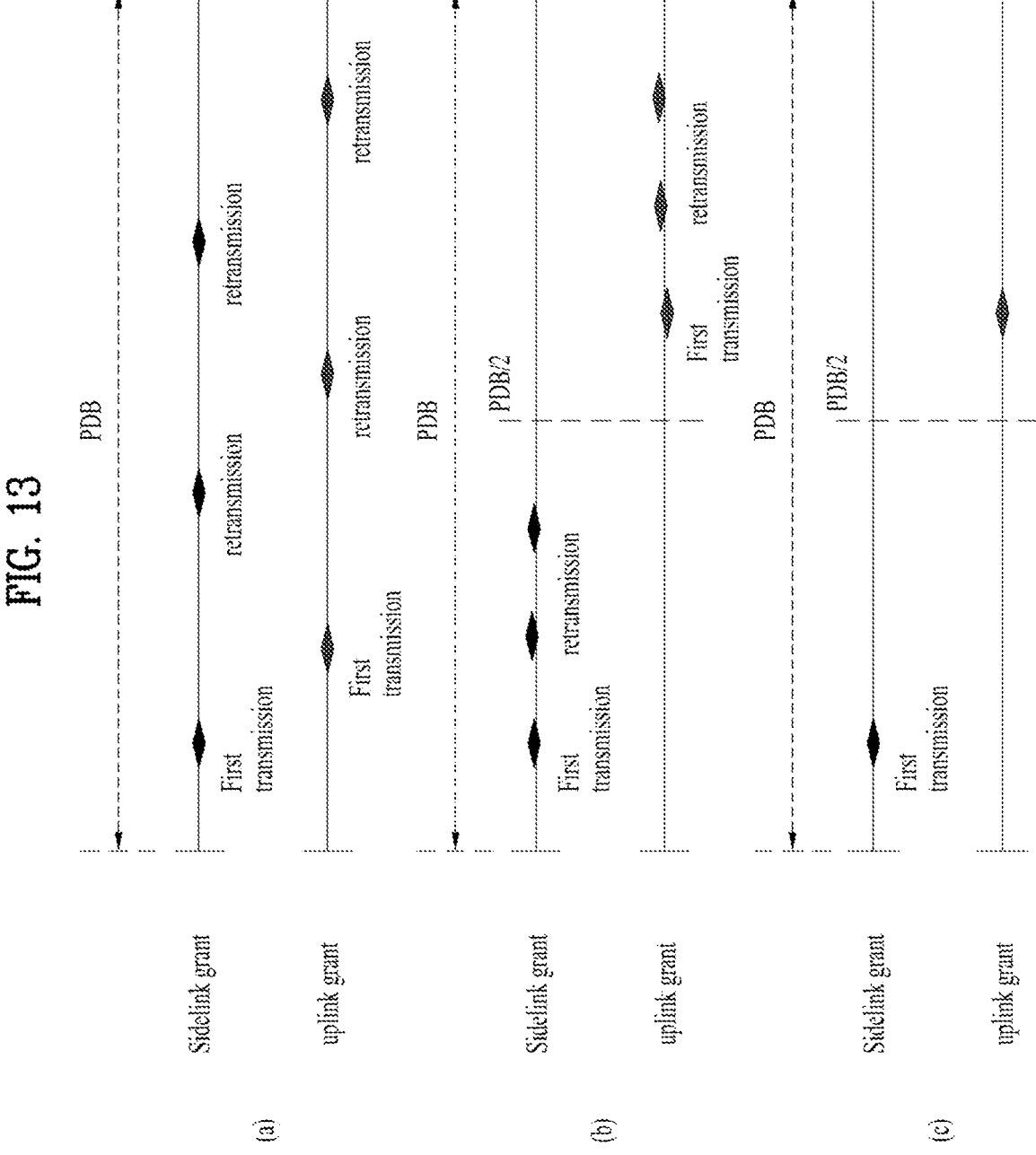

FIG. 13 shows examples related to allocation of a PDB, sidelink grant, and uplink grant, specifically, a method of allocating sidelink and uplink grants via TDM. The example of FIG. 13 may be applied to the above-described sidelink grant configuration and uplink grant configuration, or may be independently applied in the case of a configurated grant.

FIG. 13(a) is related to allocation of up to three grants in consideration of retransmission. In detail, in the case of using relay, when a maximum of three grants are allocated per link (sidelink/uplink), the gNB may allocate a sidelink grant and an uplink grant as shown in FIG. 13(a). That is, the grant for sidelink transmission needs to be allocated ahead of the grant for uplink transmission in time. In addition, allocation of these sidelink and uplink grants needs to satisfy the entire PDB of the packet to be transmitted from the remote UE. If the grant for sidelink transmit does not precede the grant for uplink transmission in time, reconfigu- ration of the grant may be requested to the gNB.

FIG. 13(b) shows an example in which ½ of a PDB is used for sidelink communication, and a time corresponding to the remaining ½ is used for uplilnk communication. For the configured grant, grant(s) allocated for sidelink needs to be located in a first half of the PDB, and grant(s) allocated for uplink needs to be located in a second half of the PDB, thereby satisfying the entire PDB.

FIG. 13(c) shows an example of sequentially allocating a sidelink grant and an uplink grant based on ½ of the PDB. In the case of a dynamic grant, when the remote UE requests a grant, one sidelink grant and one uplink grant may be allocated. When the gNB allocates the dynamic grant, the sidelink grant may be allocated to be ahead of the uplink grant in the PDB of the packet that the remote UE intends to transmit. Alternatively, as shown in the following dia- gram, a sidelink grant may be allocated to a first half of the PDB corresponding to ½ of the PDB in time, and an uplink grant may be allocated to a second half of the PDB corre- sponding to ½ of the PDB in time.

In FIG. 13, an interval between grants for each transmis- sion (first transmission or retransmission) in each PDB may be a constant value or a different value. In the above- described grant allocation method when the remote UE transmits a packet through a remote UE (FIGS. 13(a) to (c)), a time interval between sidelink grant allocation and uplink grant allocation may be limited to configure the grant by applying a minimum time interval in consideration of a process time of the relay UE.

The relay UE according to an embodiment may transfer the sidelink grant request including the Packet Delay Budget (PDB) (or PDB information) of the remote UE to the BS. That is, when the remote UE transfers the sidelink grant request message to the relay UE, the relay UE may forward the corresponding message to the gNB. In this case, the sidelink grant request message may include PDB informa- tion of a message to be transmitted. In this case, the 'grant request' message may be replaced with a Buffer Status Report (BSR) of the MAC layer.

The relay UE may receive an uplink grant configuration and a sidelink grant configuration in response to the sidelink grant request from the BS. Since the gNB knows a relay UE to which the remote UE that requests the sidelink grant request is currently connected, the BS may simultaneously generate not only the sidelink grant configuration but also the uplink grant configuration for the sidelink grant request of the remote UE transferred by the relay UE, may transmit only the uplink grant configuration to the relay UE, and may transmit only the sidelink grant configuration to the remote UE. With respect to subsequent operations and related operations, the above description may be applied in the same way.

Figure 14:
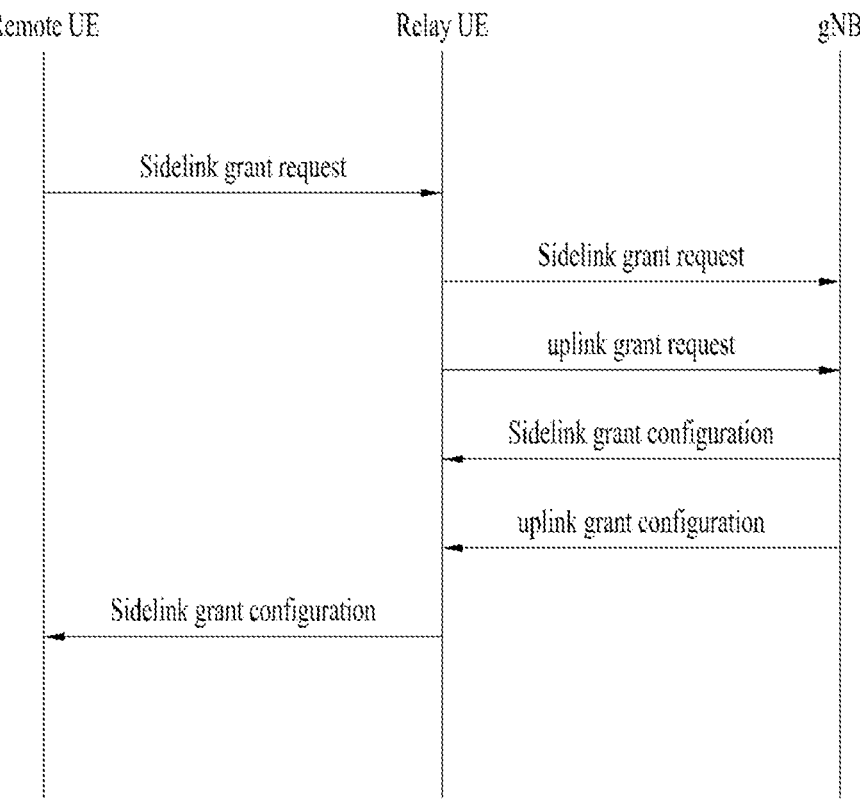
Figure 15:
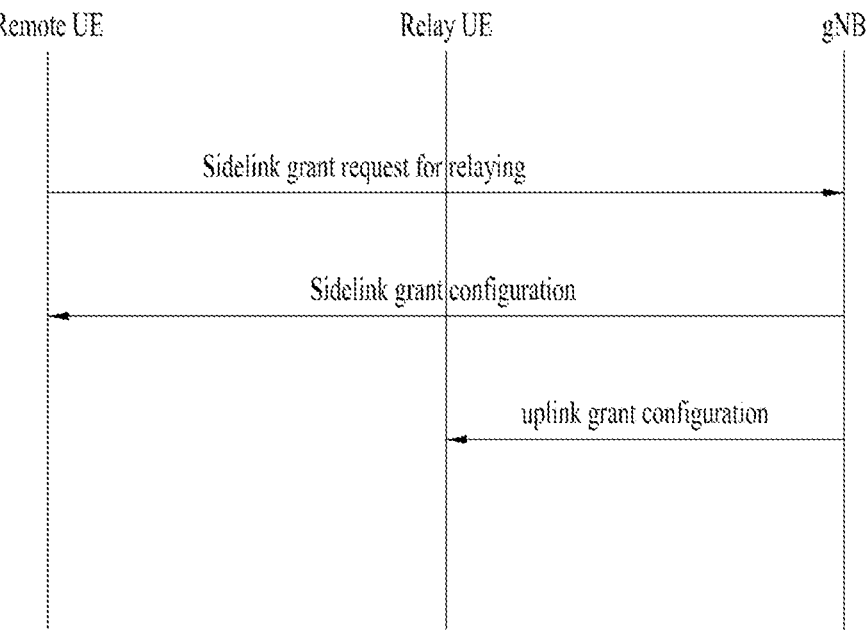
Figure 16:
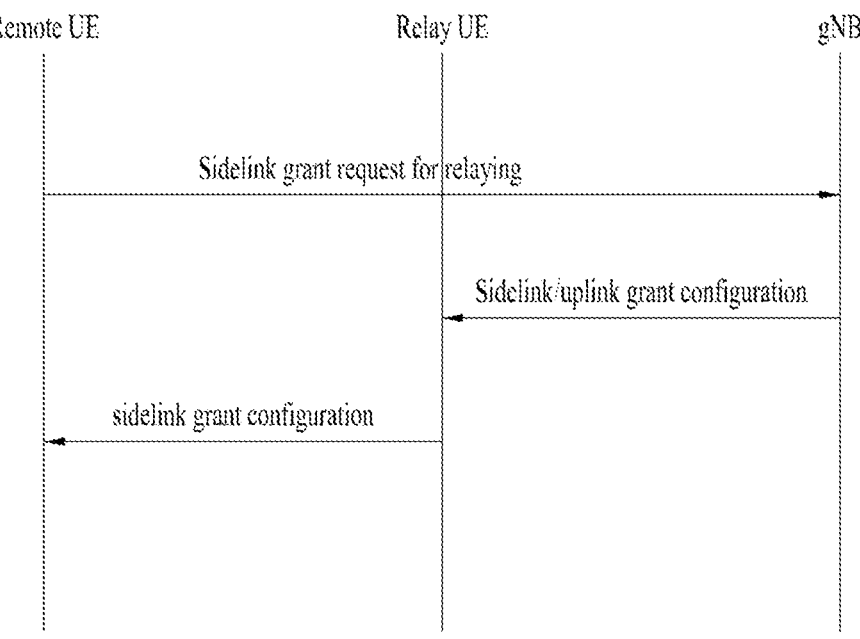

FIGS. 14 to 16 show various examples related to a grant request for transmitting a packet generated in a remote UE to a gNB.

Referring to FIG. 14, when the remote UE transmits the sidelink grant request to the relay UE, the relay UE may forward the sidelink grant request to the gNB without changes. The relay UE may transmit an uplink grant request to the gNB to transmit a packet to be transmitted from the remote UE to the gNB. If only the sidelink grant request and the uplink grant request are transmitted, the gNB may not be capable of determining a temporal precedence relationship for the corresponding grant, and thus information on a relay UE with which the sidelink grant request is associated and a remote UE with which the uplink grant request is associated needs to be included. In this case, the 'grant request' message may be replaced with a Buffer Status Report (BSR) of the MAC layer, and required PDB information of the generated packet may be included. Upon receiving the sidelink grant request message generated by the remote UE and the uplink grant message generated by the relay UE, the gNB may configure a grant corresponding to the request and may transmit the generate to the relay UE. The relay UE may transmit the sidelink grant configuration message to the corresponding remote UE without changes, and the uplink grant configuration information may be used when transferring the packet transferred from the remote UE to the gNB. In this operation, the relay UE may simply transmit the sidelink grant message generated by the remote UE to the gNB, and may simultaneously request the gNB for an uplink grant to transmit a message to be transmitted from the remote UE to the gNB.

FIG. 15 shows an example of the case in which a remote UE transmits a grant request directly to a BS. If the remote UE exists in coverage but intends to transmit a packet through a relay, the remote UE may directly request a grant to be used for sidelink for relay (i.e., a grant used for communication between the remote UE and the relay UE) to the gNB. In this case, the remote UE needs to inform the gNB of a MAC ID of the relay UE selected by the remote UE and a PDB of the packet to be transmitted. The corresponding information may be included in the BSR of the remote UE. The gNB may allocate a grant to be used for sidelink for relay to the remote UE and, at the same time, may allocate an uplink grant to the relay UE to transfer a packet transmitted from the remote UE to the gNB even if there is no request from the relay UE. When transmitting the sidelink grant configuration and the uplink grant configuration, the BS may transmit them in the order shown, or may transmit them in an order different from the order shown.

Referring to FIG. 16, when a remote UE exists in coverage, but intends to transmit a packet through a relay, the remote UE may directly make a request for a grant to be used for sidelink for relay (i.e., a grant used in communication between the remote UE and the relay UE) to the gNB. In this case, the remote UE needs to inform the gNB of the MAC ID of the relay UE selected by the remote UE and the PDB of the packet to be transmitted. The corresponding information may be included in the BSR of the remote UE. The gNB may transmit sidelink and uplink grant configurations to the relay UE included in the grant request of the remote UE. In this case, since there may be a plurality of remote UEs connected to the relay UE, the gNB needs to announce information on a remote UE corresponding to the corresponding sidelink/uplink configuration. The relay UE receiving this may transfer the configuration corresponding to the sidelink grant to the remote UE.

Meanwhile, the packet of the remote UE may include SidelinkUEInformation-related information of the remote UE. Here, the SidelinkUEInformation-related information of the remote UE may include the SidelinkUEInformation received by the relay UE from the remote UE in the SidelinkUEInformation of the relay UE. The SidelinkUE-Information-related information of the remote UE may include ID related information of the remote UE, and the ID related information of the remote UE may be received from the remote UE or may be newly allocated by the relay UE.

In the above description, the UE may communicate with at least one of another UE, a UE related to an autonomous driving vehicle, a BS, or a network.

In relation to the above description, a relay User Equipment (UE) may include at least one processor, and at least one computer memory operatively connected to the at least one processor and configured to store instructions for causing the at least one processor to perform operations when being executed, and in this case, the operations may include transferring a sidelink grant request including a Packet Delay Budget (PDB) of a remote UE to a base station (BS), and receiving an uplink grant configuration and a sidelink grant configuration in response to the sidelink grant request from the BS, and in this case, the relay UE may transfer only information related to the sidelink grant configuration among the uplink grant configuration and the sidelink grant configuration to the remote UE, the uplink grant configuration may be used to transfer a packet of the remote UE received through a resource indicated in the sidelink grant configuration to the BS, and both the resource indicated in the sidelink grant configuration and a resource indicated in the uplink grant configuration may satisfy the PDB. For a detailed description related thereto, the above description may be referred to.

An operation method of a BS may include receiving a sidelink grant request including a Packet Delay Budget (PDB) of a remote UE from a relay UE by the BS, and transmitting an uplink grant configuration and a sidelink grant configuration in response to the sidelink grant request to the relay UE by the BS, and in this case, only information related to a sidelink grant configuration among the uplink grant configuration and the sidelink grant configuration to the remote UE through the relay UE, the uplink grant configuration may be used to transfer a packet of the remote UE received through a resource indicated in the sidelink grant configuration to the BS, and both the resource indicated in the sidelink grant configuration and a resource indicated in the uplink grant configuration may satisfy the PDB. For a detailed description related thereto, the above description may be referred to.

ABS (device) may include at least one processor, and at least one computer memory operatively connected to the at least one processor and configured to store instructions for causing the at least one processor to perform operations when being executed, and in this case, the operations may include receiving a sidelink grant request including a Packet Delay Budget (PDB) of a remote UE from a relay UE, and transmitting an uplink grant configuration and a sidelink grant configuration in response to the sidelink grant request to the relay UE, and in this case, only information related to a sidelink grant configuration among the uplink grant configuration and the sidelink grant configuration to the remote UE through the relay UE, the uplink grant configuration may be used to transfer a packet of the remote UE received through a resource indicated in the sidelink grant configuration in the sidelink grant configuration to the BS, and both the resource indicated in the sidelink grant configuration and a resource indicated in the uplink grant configuration may satisfy the PDB. For a detailed description related thereto, the above description may be referred to.

In a processor for performing operations for a relay UE, the operations may include transferring a sidelink grant request including a Packet Delay Budget (PDB) of a remote UE to a base station (BS), and receiving an uplink grant configuration and a sidelink grant configuration in response to the sidelink grant request from the BS, and in this case, the relay UE may transfer only information related to the sidelink grant configuration among the uplink grant configuration and the sidelink grant configuration to the remote UE, the uplink grant configuration may be used to transfer a packet of the remote UE received through a resource indicated in the sidelink grant configuration to the BS, and both the resource indicated in the sidelink grant configuration and a resource indicated in the uplink grant configuration may satisfy the PDB. For a detailed description related thereto, the above description may be referred to.

In a non-volatile computer-readable storage medium for storing at least one computer program including an instruction for causing at least one processor to perform operations for a user equipment (UE) when being executed by the at least one processor, the operations may include transferring a sidelink grant request including a Packet Delay Budget (PDB) of a remote UE to a base station (BS), and receiving an uplink grant configuration and a sidelink grant configuration in response to the sidelink grant request from the BS, and in this case, the relay UE may transfer only information related to the sidelink grant configuration among the uplink grant configuration and the sidelink grant configuration to the remote UE, the uplink grant configuration may be used to transfer a packet of the remote UE received through a resource indicated in the sidelink grant configuration to the BS, and both the resource indicated in the sidelink grant configuration and a resource indicated in the uplink grant configuration may satisfy the PDB. For a detailed description related thereto, the above description may be referred to.

In the above description, the SidelinkUEInformation may be based on the 3GPP TS 38.331. For a detailed description related thereto, the above description may be referred to.

RxInterestedFreqList, and a transmission resource may be allocated differently depending on a destination ID of the sl-TxResourceRequestList. The BS may coordinate a resource for sidelink transmission/reception, and for example, may report the destination ID and may allocate the transmission resource of the relay UE to the resource pool that the destination UE is capable of receiving, or may allocate the transmission resource of the relay UE, may reconfigure the reception resource of the corresponding destination UE. A remote UE may exist inside/outside the coverage, and may not have an RRC connection with the BS. In such an environment, transfer of the sidelink-RemoteUEInformation for allocation of a resource coordinated from a BS by a remote may be proposed as follows.

Since the remote UE and the BS are not in the RRC connection state, the relay UE in an RRC connection state may transfer contents corresponding to the sidelinkUEInformation contents of the remote UE to the BS. That is, the remote UE that has completed the PC5-S connection with the relay UE may transmit sidelinkUEInformation to the relay UE without a process of RRCsetup/RRCcomplete with the BS. To this end, the relay UE may inform that the relay UE itself is a relay UE connected to the BS in a Discovery message or a message required for performing a PC5 setup.

The relay UE that receives SidelinkUEInformation from the remote UE may convert SidelinkUEInformation thereof and the SidelinkUEInformation received from the remote UE into an element of SidelinkRemoteUEInformation and may transmit the SidelinkUEInformation to the BS. In this case, sl-RemoteUEIdentification indicating an ID of the remote UE may be added to the SidelinkRemoteUEInformation element. Multiple remote UEs may exist in the relay UE, and since each remote UE transmits sidelinkUEInformation of other contents, identity to distinguish them may be required. An identification value used at this time may be received from the remote UE may be newly allocated by the relay UE. This is because the relay UE is capable of being identified as long as the newly assigned value and the value used by the remote UE are mapped to each other. That is, as shown in Table 5 below, the sidelinkRemoteUEInformationNR-r16 element may be optionally added to the sidelinkUEInformation of the relay UE. The content of other specific items may be used in the same way as the content of the existing SidelinkUEInformationNR-r16.

TABLE 5

```
sidelinkUEInformationNR-r16-Ies ::= SEQUENCE {
    criticalExtensions                    CHOICE {
        sidelinkUEInformationNR-r16           SidelinkUEInformationNR-r16-IEs,
        sidelinkRemoteUEInformationNR-r16     SidelinkRemoteUEInformatoinNR-r16-IEs, OPTIONAL,
        criticalExtensionFuture               SEQUENCE { }
    }
}
SidelinkRemoteUEInformationNR-r16-IEs ::= SEQUENCE {
    sl-RemoteUEIdentification-r16           RemoteUEIdentification-r16              OPTIONAL,
    sl-RemoteUERxInterestedFreqList-r16     sl-RemoteUEInterestedFreqList-r16       OPTIONAL,
    sl-RemoteUETxResourceReqList-r16        sl-RemoteUETxResourceReqList-r16        OPTIONAL,
    nonCriticalExtension                    SEQUENCE { }                            OPTIONAL
}
..........
```

When the relay UE transmits the SidelinkUEInformationNR to the BS, the BS may allocate a resource pool to be used by the relay UE for sidelink transmission/reception and may inform the resource pool with an RRC message. A reception pool is highly likely to be allocated in the sl- The BS that receives the SidelinkUEInformation message including the SidelinkRemoteUEInformation of the remote UE from the relay UE may transfer a RRCreconfiguration message for the relay UE and the remote UEs to the relay UE. Upon receiving this, the relay UE may transfer only the RRCreconfiguration message corresponding to each remote UE according to the identification of the remote UE.

Through this method, the remote UE may receive coordination of transmission/reception resources without establishing an RRC connection with the BS, and the BS may manage a resources related to the relay UE and the remote UE with one RRC reconfiguration. In the above description, the names of RRC elements such as SidelinkUEInformation and SidelinkRemoteUEInformation may be exemplary, and may be replaced with other names indicating the corresponding element.

As described above, when the relay UE and the remote UE establish a remote UE PC5-S (PC5-RRC) connection instead of a method in which a general UE establishes an RRC connection in a process of setting up a conventional RRCconnection, information on the remote may also be included in the SidelinkUEInformation and may be transferred to the gNB, and thus the relay UE and the remote UE may receive RRC reconfiguration at once. Through this, the remote UE may reduce the process of establishing an RRC connection with the BS and receiving reconfiguration, thereby reducing signaling overhead.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
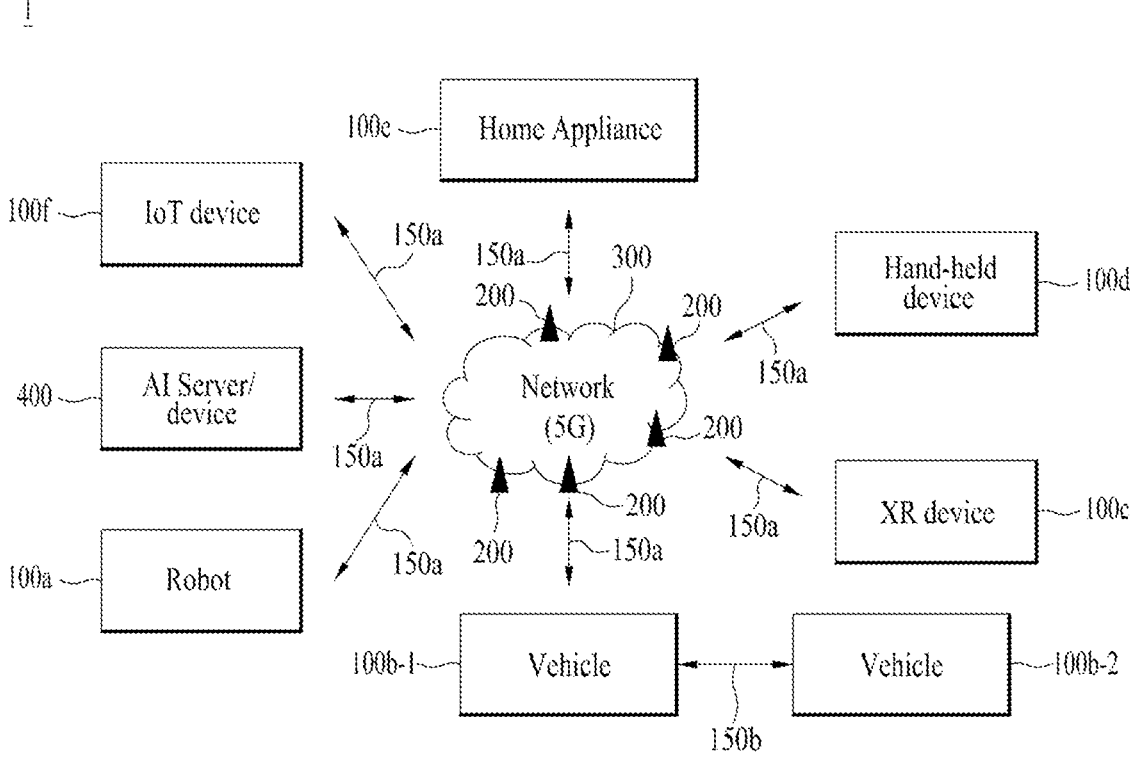
FIGS. 17 to 23 are diagrams for explaining various apparatus to which embodiment(s) is applicable.

FIG. 17 illustrates a communication system 1 applied to the present disclosure.

Referring to FIG. 17, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 10f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/ the wireless devices may transmit/receive radio signals to/from each other through the wireless communication/ connections 150a and 150b. For example, the wireless communication/connections 150a and 150b may transmit/ receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 18:
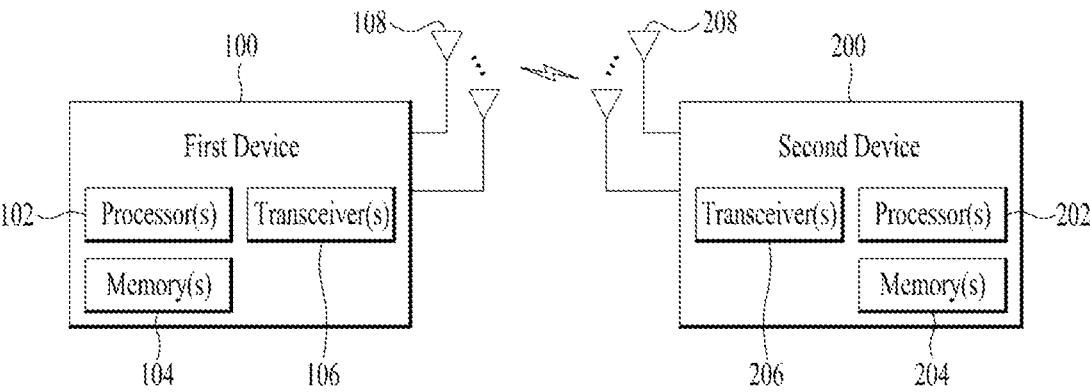

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s)

104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
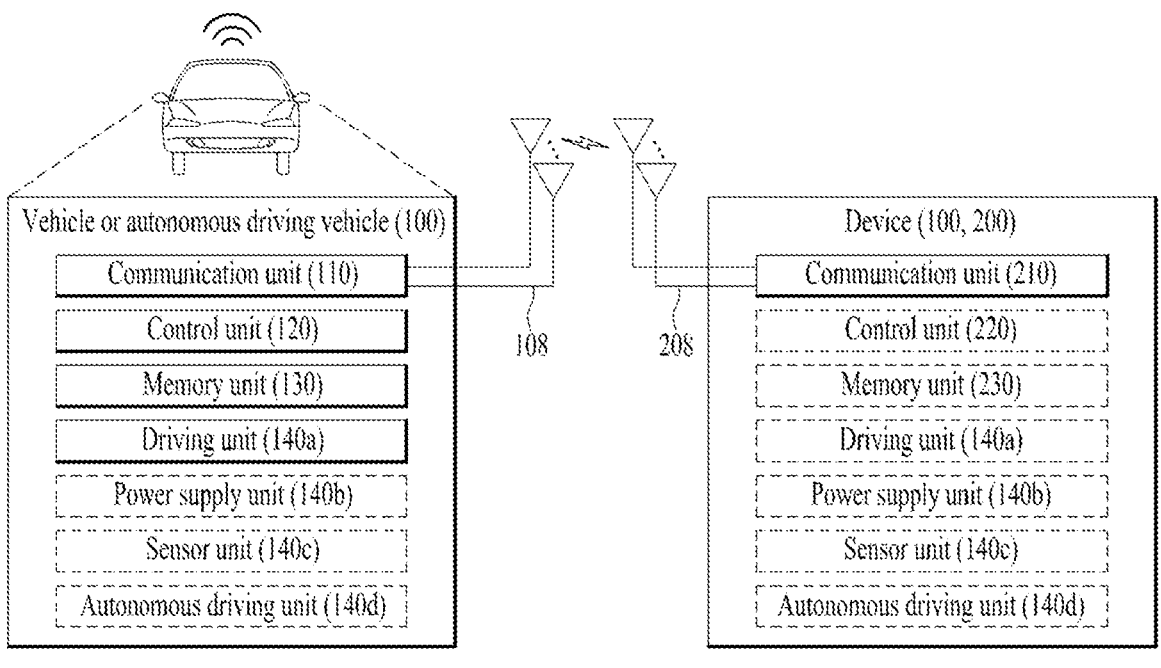

Examples of a vehicle or an autonomous driving vehicle applicable to the present disclosure FIG. 19 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 20:
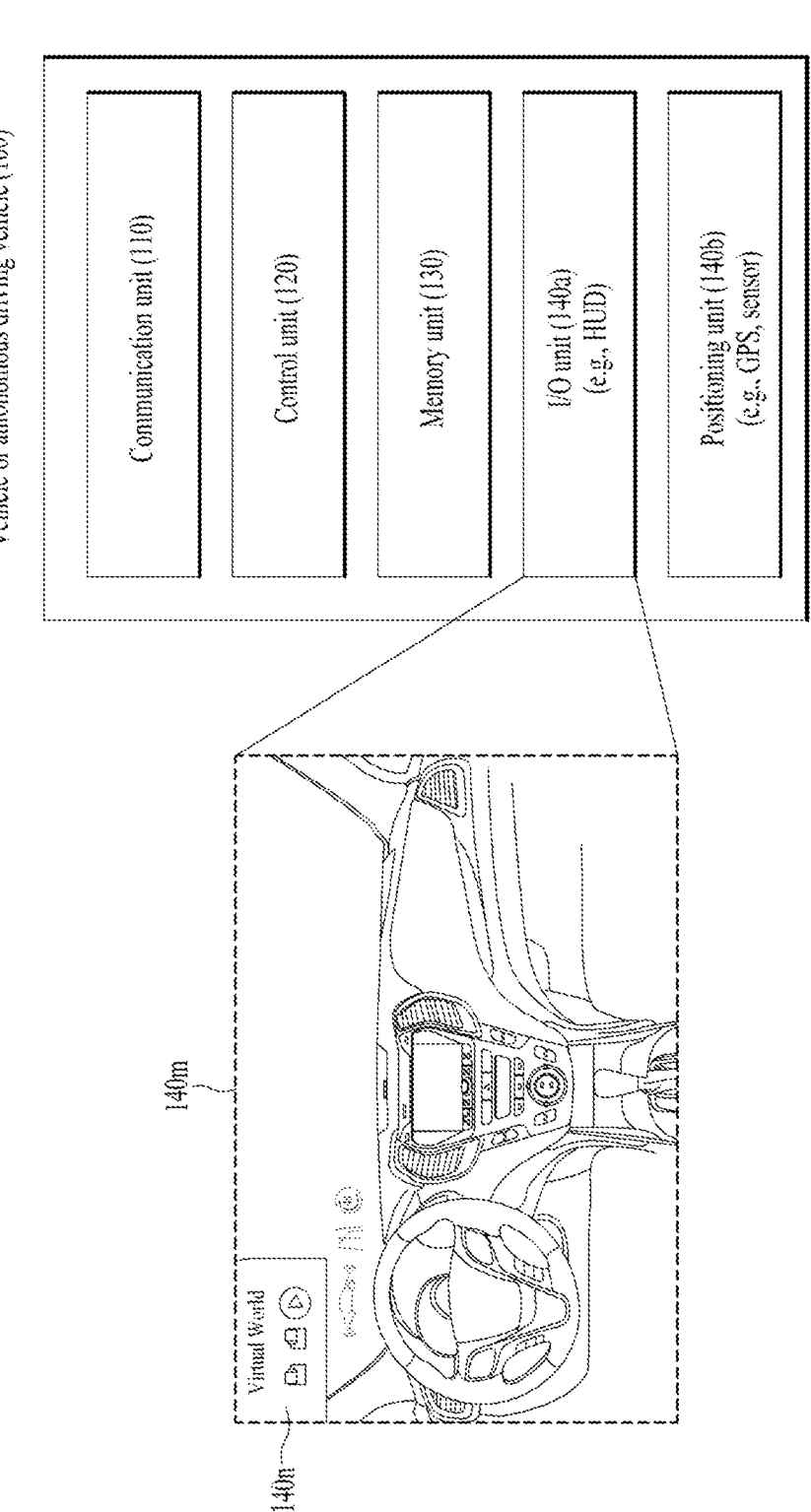

FIG. 20 illustrates a vehicle applied to the present disclosure. The vehicle may be implemented as a transport means, an aerial vehicle, a ship, etc.

Referring to FIG. 20, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 43.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR device applicable to the present disclosure

Figure 21:
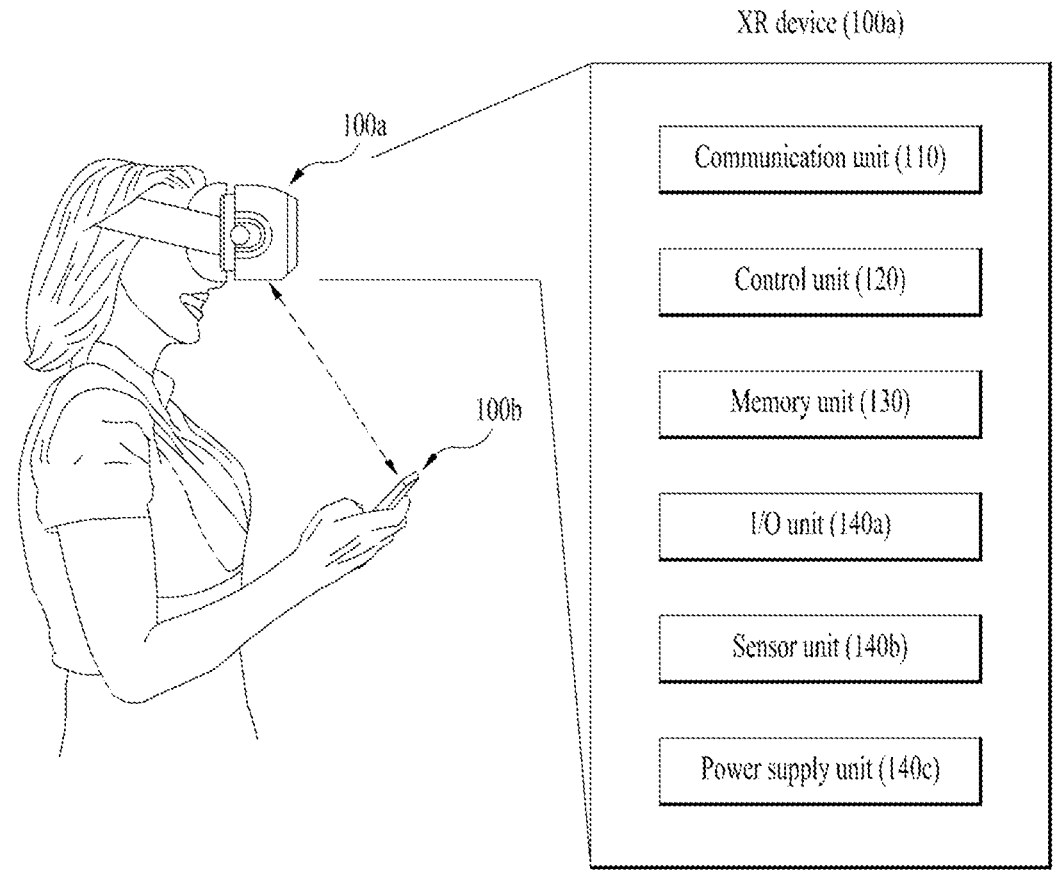

FIG. 21 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 21, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 43, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present
Disclosure

Figure 22:
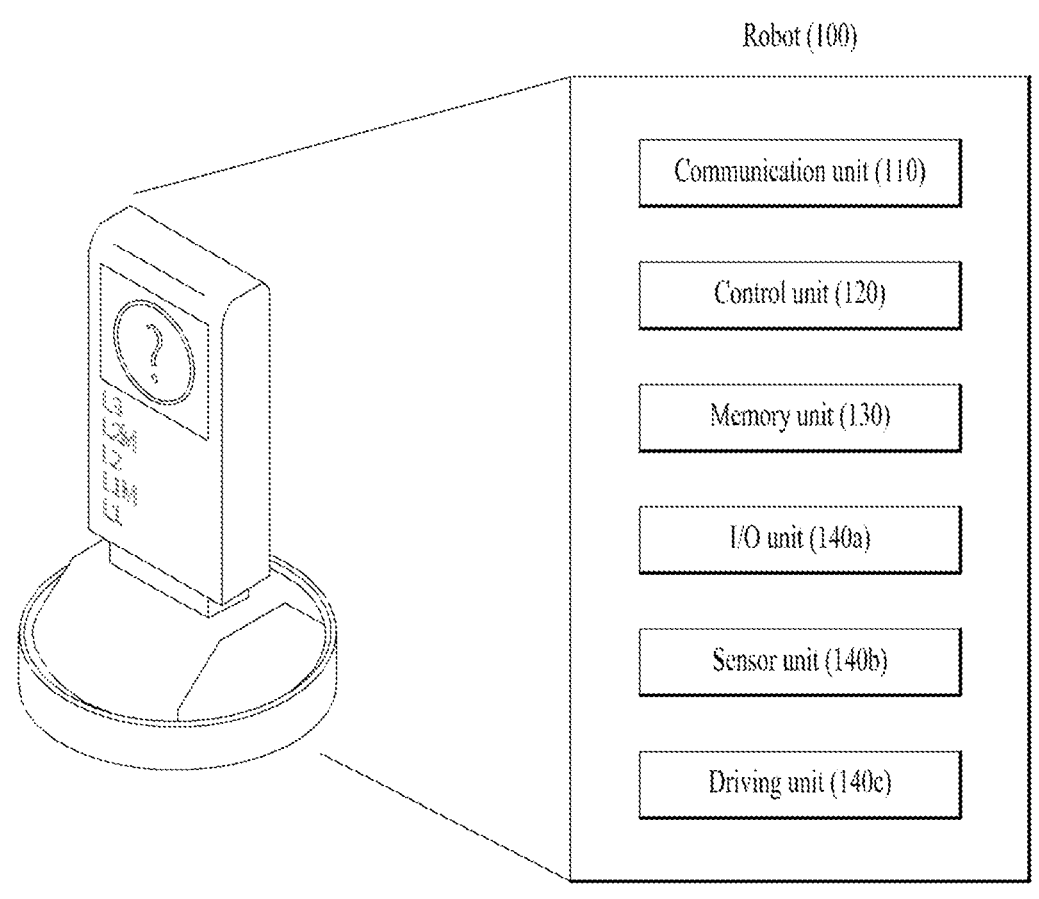

FIG. 22 illustrates a robot applied to the present disclosure. The robot may be categorized into an industrial robot, a medical robot, a household robot, a military robot, etc., according to a used purpose or field.

Referring to FIG. 22, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 18, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI device to which the present disclosure is applied.

Figure 23:
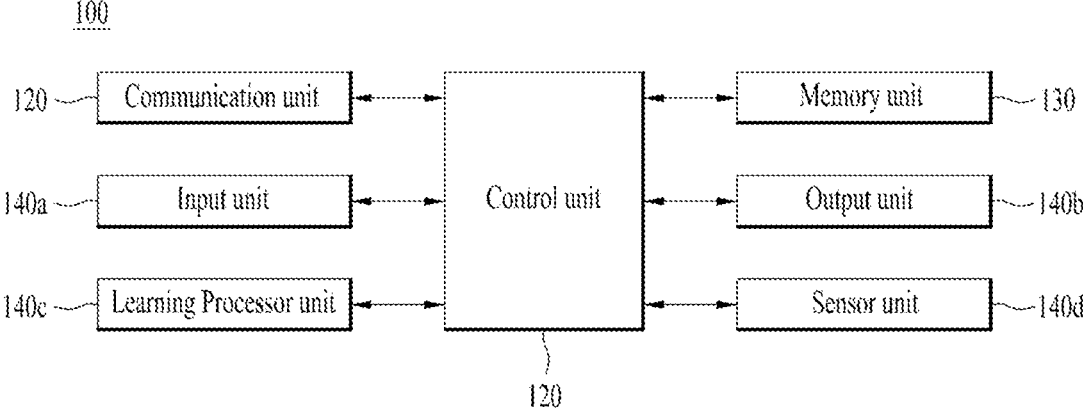

FIG. 23 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 23, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 18, respectively.

The communication unit 110 may transmit and receive wired/radio signals (e.g., sensor information, user input, learning models, or control signals) to and from external devices such as other AI devices (e.g., 100x, 200, or 400 of FIG. 17) or an AI server (e.g., 400 of FIG. 17) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 17). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 17). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

The above-described embodiments of the present disclosure are applicable to various mobile communication systems.

The invention claimed is:

1. An operation method of a relay user equipment (UE) related to a UE to UE direct communication in a wireless communication system, the method comprising:

transferring, by a relay UE, a first grant request including a Packet Delay Budget (PDB) of a remote UE to a base station (BS); and receiving, by the relay UE, a second grant configuration and a first grant configuration in response to the first grant request from the BS, wherein the relay UE transfers only information related to the first grant configuration among the second grant configuration and the first grant configuration to the remote UE, wherein a second resource related to the second grant configuration which is used to transfer a packet of the remote UE received through a first resource related to the first grant configuration to the BS, wherein the first resource precedes the second resource indicated in the second grant configuration in a time axis, and, wherein a pair of the preceding first resource and the second resource satisfies the PDB.

2. The method of claim 1, wherein the first grant configuration includes an ID related information of the remote UE.

3. The method of claim 2, wherein the ID related information is a Medium Access Control (MAC) ID of the remote UE.

4. The method of claim 1, wherein a packet of the remote UE includes information related to SidelinkUEInformation of the remote UE.

5. The method of claim 4, wherein the information related to the SidelinkUEInformation of the remote UE includes SidelinkUEInformation received from the remote UE in the SidelinkUEInformation of the relay UE.

6. The method of claim 4, wherein the information related to the SidelinkUEInformation of the remote UE includes ID related information of the remote UE.

7. The method of claim 6, wherein the ID related information of the remote UE is received from the remote UE.

8. The method of claim 7, wherein the ID related information of the remote UE is newly allocated by the relay UE.

9. A relay User Equipment (UE) related to a UE to UE direct communication in a wireless communication system, comprising:

at least one processor; and at least one computer memory operatively connected to the at least one processor and configured to store instructions for causing the at least one processor to perform operations when being executed, wherein the operations include:

transferring a first grant request including a Packet Delay Budget (PDB) of a remote UE to a base station (BS); and receiving a second grant configuration and a first grant configuration in response to the first grant request from the BS, wherein the relay UE transfers only information related to the first grant configuration among the second grant configuration and the first grant configuration to the remote UE, wherein a second resource related to the second grant configuration which is used to transfer a packet of the remote UE received through a first resource related to the first grant configuration to the BS, wherein the first resource precedes the second resource indicated in the second grant configuration in a time axis, and, wherein a pair of the preceding first resource and the second resource satisfies the PDB.

10. The relay UE of claim 9, wherein the relay UE communicates with at least one of another UE, a UE related to an autonomous driving vehicle, a BS, or a network.

11. An operation method of a base station (BS) related to a sidelink relay in a wireless communication system, the method comprising:

receiving a first grant request including a Packet Delay Budget (PDB) of a remote UE from a relay UE by the BS; and transmitting a second grant configuration and a first grant configuration in response to the first grant request to the relay UE by the BS, wherein only information related to the first grant configuration among the second grant configuration and the first grant configuration is transferred to the remote UE through the relay UE, wherein a second resource related to the second grant configuration which is used to transfer a packet of the remote UE received through a first resource related to the first grant configuration to the BS, wherein the first resource precedes the second resource indicated in the second grant configuration in a time axis, and, wherein a pair of the preceding first resource and the second resource satisfies the PDB.

12. A base station (BS) in a wireless communication system, comprising:

at least one processor; and at least one computer memory operatively connected to the at least one processor and configured to store instructions for causing the at least one processor to perform operations when being executed, wherein the operations include:

receiving a first grant request including a Packet Delay Budget (PDB) of a remote UE from a relay UE; and transmitting a second grant configuration and a first grant configuration in response to the first grant request to the relay UE, wherein only information related to the first grant configuration among the second grant configuration and the first grant configuration is transferred to the remote UE through the relay UE, wherein a second resource related to the second grant configuration which is used to transfer a packet of the remote UE received through a first resource related to first grant configuration to the BS, wherein the first resource precedes the second resource indicated in the second grant configuration in a time axis, and,

wherein a pair of the preceding first resource and the second resource satisfies the PDB.

13. A processor for performing operations for a relay user equipment (UE) related to a sidelink relay in a wireless communication system, the operations comprising:

transferring a first grant request including a Packet Delay Budget (PDB) of a remote UE to a base station (BS); and receiving a second grant configuration and a first grant configuration in response to the first grant request from the BS, wherein the relay UE transfers only information related to the first grant configuration among the second grant configuration and the first grant configuration to the remote UE, wherein a second resource related to the second grant configuration which is used to transfer a packet of the remote UE received through a first resource related to first grant configuration to the BS, wherein the first resource precedes the second resource indicated in the second grant configuration in a time axis, and, wherein a pair of the preceding first resource and the second resource satisfies the PDB.

14. A non-volatile computer-readable storage medium for storing at least one computer program including an instruction for causing at least one processor to perform operations for a relay user equipment (UE) related to a sidelink relay when being executed by the at least one processor, the operations comprising:

transferring a first grant request including a Packet Delay Budget (PDB) of a remote UE to a base station (BS); and receiving a second grant configuration and a first grant configuration in response to the first grant request from the BS, wherein the relay UE transfers only information related to the first grant configuration among the second grant configuration and the first grant configuration to the remote UE, wherein a second resource related to the second grant configuration which is used to transfer a packet of the remote UE received through a first resource related to the first grant configuration to the BS, wherein the first resource precedes the second resource indicated in the second grant configuration in a time axis, and, wherein a pair of the preceding first resource and the second resource satisfies the PDB.

* * * * *